(12) United States Patent
Brueckheimer et al.

(10) Patent No.: US 6,252,876 B1
(45) Date of Patent: Jun. 26, 2001

(54) MANAGEMENT OF DATA STRUCTURES

(75) Inventors: Simon Daniel Brueckheimer, London; David John Stacey, Stansted Abbotts, both of (GB)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/869,898

(22) Filed: Jun. 5, 1997

(30) Foreign Application Priority Data

Dec. 23, 1996 (GB) .................................................. 9626752

(51) Int. Cl.[7] ............................... H04L 12/28; H04J 3/24
(52) U.S. Cl. .......................... 370/394; 370/395; 370/474
(58) Field of Search ................................... 370/378, 379, 370/382, 394, 395, 397, 402, 414, 411, 412, 418, 470, 471, 474, 476

(56) References Cited

U.S. PATENT DOCUMENTS

| | | |
|---|---|---|
| 3,988,601 | 10/1976 | Perry . |
| 4,040,024 | 8/1977 | Cowe et al. . |
| 4,075,694 | 2/1978 | Ericsson . |
| 4,686,670 | 8/1987 | Kessels et al. . |
| 5,214,639 | * 5/1993 | Herion ................................. 370/412 |
| 5,274,768 | 12/1993 | Traw et al. . |
| 5,311,509 | * 5/1994 | Heddes et al. ....................... 370/412 |
| 5,521,916 | * 5/1996 | Choudhury et al. ................. 370/395 |
| 5,724,358 | * 3/1998 | Headrick et al. .................... 370/418 |
| 5,745,489 | * 4/1998 | Diaz et al. ........................... 370/412 |
| 5,815,501 | * 9/1998 | Gaddis et al. ....................... 370/402 |
| 5,940,375 | * 8/1999 | Soumiya et al. .................... 370/412 |

FOREIGN PATENT DOCUMENTS

| | | |
|---|---|---|
| 0237337 A2 | 3/1987 | (EP) . |
| 1445763 | 2/1973 | (GB) . |

* cited by examiner

Primary Examiner—Chau Nguyen
Assistant Examiner—Chiho Andrew Lee
(74) Attorney, Agent, or Firm—Lee, Mann, Smith, McWilliams, Sweeney & Ohlson

(57) ABSTRACT

A data structure, such as a telecommunications connection map, comprises at least one list of data elements which are stored in a predetermined sequence of locations of a memory device. The structure is updated by moving a portion of the list through the sequence of memory locations so as to insert a new element into, or delete or change an existing element at, a particular position in the structure while maintaining the order of the list. Elements of the structure are accessed in the sequence in which they are stored and the structure is updated during the accessing of the structure by moving elements through the sequence of memory locations. A particular application of this invention is in maintaining a connection map for a telecommunications switch, the map storing connection instructions defining into which ATM cell payload received narrowband call data is assembled.

3 Claims, 13 Drawing Sheets

LINKED LIST IDENTIFIER 35

FIRST EMPTY LOCATION (DENOTED BY END-OF-LISTS MARKER)

MANAGEMENT OF DATA STRUCTURES

TECHNICAL FIELD

This invention relates to data structures, and in particular to the management of dynamic data lists within a real-time environment. One particular application of the invention is in updating connection maps in telecommunications systems.

BACKGROUND OF THE INVENTION

One known way of storing data is in the form of a linked list. A linked list enables the dynamic storage of uniform or non-uniform data items. A number of related data items can be contained within a single list, with each item being linked to the next in the list by a pointer field. This is essentially a software process. The pointer field enables the list to be traversed and the data accessed. In its simplest form new items are always added to the bottom of the list and old items are always removed from the top of the list. A common example of this is a FIFO device. Updating this type of list requires the operations of list concatenation and item removal. One example of an application in which this type of list is used is in the queuing of tasks within an operating system, with tasks being scheduled purely according to their arrival time.

A more complex use of a linked list allows for the ordering of all or part of the data information within the list. Updating this type of list requires the ability to add new items or delete existing items at arbitrary positions within the list. Examples of applications in which this type of list is used include the configuration of routing tables, call records, and translation tables in telecommunications systems and the scheduling of tasks, by priority, in computer operating systems. U.S. Pat. No. 5,274,768 (Traw et al.) describes an interface for Asynchronous Transfer Mode (ATM) networks which uses this kind of linked list manager.

An example of this type of list is shown in FIG. 1. A memory 30 has a plurality of memory locations, which are numbered 1 to 20. A reserved part of the memory, such as location 1, holds a pointer start_ptr to the memory location of the first element in the list. In this example the first element in the list occupies memory location 4. It could however occupy any one of the memory locations. An enlargement shows the contents of memory location 4 in more detail. A data item DATA and a pointer ptr_next are stored at this memory location. The pointer points to the memory location of the next element in the linked list. This has a value "16" which is the memory location where the second element in the list is stored. The memory holds a number of similar elements which are linked to one another in this manner.

The process for updating this type of list will now be described with reference to FIGS. 1A to 1C. FIG. 1A shows two elements, one stored at memory location 4, and a second at memory location 9. The pointer of the element at location 4 points to the memory location 9.

Firstly, the situation where a new element needs to be added to the list is considered. The new element is inserted at an available location in the memory. This is location 16. The element must be tied into the list at the required point. FIG. 1B shows the result of adding this new element to the list between the two existing elements. The pointer value of the element held at memory location 4 now points to memory location 16, and the pointer value of the newly inserted element points to memory location 9.

Secondly, the situation where an existing element needs to be deleted from the list is considered. The existing element at memory location 16 needs to be removed from the list. The pointer value of the element held at location 4 is changed to point to the memory location of the element following the one to be deleted i.e. the element at location 9.

A problem associated with linked lists is that in order to find a particular data item the list must be searched in a systematic manner, beginning at the first element in the list and continuing through the list until the item is found. This makes the search process slow. To improve the access process, doubly linked lists are also commonly used. In a doubly linked list, for each data item, pointers are used to indicate both the next element in the list and the previous item in the list. In this manner the list may be traversed in either direction.

The use of linked lists and doubly-linked lists has a number of problems. Firstly the process of configuring and maintaining the lists is complex and thus necessitates its implementation using software. This precludes their use for real-time, high throughput applications. Secondly, the task of updating the linked lists usually requires that the process of accessing the data is interrupted. Thirdly, there is a need to store both the data elements and the pointers which link the elements together.

One known method for updating data lists within real-time hardware systems involves the use of a shadow memory. Firstly, an updated list is configured within the shadow memory and then, secondly, this is swapped with the original memory to complete the update process. Using a shadow memory has a disadvantage of requiring a doubling of the overall memory requirement. It is therefore a particularly expensive option for very high speed real-time applications which demand expensive, high-performance memory devices.

Both of these techniques have undesirable attributes, particularly for use in real-time applications.

The present invention seeks to provide an improved method of updating a data table or list which minimises the disadvantages of the prior art methods.

SUMMARY OF THE INVENTION

According to an aspect of the present invention there is provided a method of updating at least one list of data elements stored in a predetermined sequence of locations of a memory device, the method comprising updating the list by moving a portion of the list through the sequence of memory locations. Storing data elements in a predetermined sequence of locations avoids the need for complex pointer mechanisms to link one element in the list to the next. Several linked lists can be managed simultaneously, sharing a common memory resource. The method is suitable for many of the applications where linked lists and doubly-linked lists have traditionally been used to maintain dynamic data structures under software and/or hardware control.

The moving process avoids the need for a large additional high speed memory, as used in known shadow memory techniques. The method is both simple and requires a minimum of apparatus for its implementation.

The order in which the elements of the list are maintained may have a significance. By updating the list such that a new element is inserted into, or an existing element at a particular position in the list is deleted or changed by moving a portion of the list through the sequence of memory locations has the important advantage of maintaining the elements of the list in their order when updates are performed.

Preferably the step of updating the list to insert a new element into the list at a particular position comprises moving data elements which follow that position forward through the sequence of memory locations to open a space to fit the new element, and inserting the new element into the space.

Preferably the step of updating the list to delete an existing item at a particular position in the list comprises moving data elements which follow that position backwards through the sequence of memory locations to overwrite the existing item.

Preferably the predetermined sequence of memory locations in which the data elements are stored is a sequence of contiguous memory locations. This simplifies the process of stepping between data elements in the list.

Preferably the elements of the list are accessed in the sequence in which they are stored and the list is updated during the accessing of the structure. Performing updates during the normal accessing of the list removes the necessity to interrupt the system during an update period. This technique is ideally suited to cyclic applications where the complete set of data is read sequentially once per cycle of operation. Connection tables for telecommunications applications are one example where this cyclic reading occurs. The technique proposed requires a minimum of control overheads compared to a traditional linked list and its simplicity of operation ensures that very high access and maintenance rates may be achieved in a system which is entirely hardware, or a combination of hardware and a minimum of software. Updating the data can be completely transparent to the normal operation of the memory, i.e. it is not necessary to interrupt the reading access process whilst an update occurs.

Preferably a set of instructions for updating the data list is stored, the set being arranged according to the order in which the list is accessed. This allows a complete list of updates for the list, which may include the addition and deletion of multiple data items, to be accomplished in a single cycle.

Preferably read and write operations are performed on the list at each access of the list. This can be achieved by maintaining a read pointer and a write pointer to memory locations and performing the following steps at each access of the list: reading a memory location determined by the read pointer; and writing to a memory location determined by the write pointer.

Preferably the method further comprises:
reading contents of the memory location determined by the read pointer into a second memory, and
writing to the memory location determined by the write pointer one of the following: oldest contents of the second memory; a new item to be inserted into the list; or nothing. The second memory preferably comprises a FIFO device. It can alternatively comprise a reserved part of the main memory configured to work as a FIFO.

The step of deleting an item at a particular position in the list preferably comprises setting the write pointer to lag the read pointer whereby to move the data elements following the delete position backwards through the sequence of memory locations to overwrite the desired data element.

The step of inserting a new data element into the list at a particular memory location preferably comprises: reading the data element stored at that location into a second memory; and writing the new element into the memory location and on subsequent accesses reading the data element at the next location into the second memory and writing the oldest data element in the second memory into that next location whereby to move data elements which follow the new element forward through the sequence of memory locations.

According to another aspect of the invention there is provided a method for managing a connection map for a telecommunications switch, the map comprising a list of connection instructions for the switch stored in a predetermined sequence of locations within a memory, the method comprising the step of updating the map by moving a portion of the list instructions through the sequence of memory locations.

Preferably the instructions in the map are read in the sequence in which they are stored.

Preferably the method for managing a connection map forms part of a method of operating a telecommunications switch comprising:
receiving data from a plurality of sources at an input to the switch;
buffering the received data;
assembling the received data into payloads;
transmitting the payloads from an output of the switch to a plurality of destinations; wherein the connection instructions define into which payload the buffered data is assembled.

Preferably the connection map is ordered so as to assemble the payloads in the order that they will be disassembled at their destination. This avoids the need for a frame store at the destination and avoids the transmission delay which this frame store incurs. The received data can comprise narrowband channels, and the payload can comprise the payload of an ATM cell.

The method for managing a connection map can further comprise:
receiving a request for a multicast connection between a source and multiple destinations;
creating a set of update instructions for the map;
updating the map with the set of update instructions during the use of the map. The ability to easily configure and manage the connectivity required for multicast narrowband telephony calls is a particularly desirable feature for future networks supporting advanced features such as multi-media and conferencing services.

The method for man aging a connection map can further comprise:
summing the elements of the map representing connections for a particular destination;
computing the size of a payload corresponding to that sum;
determining if padding of the payload is required;
activating padding depending on the result of the determination. Implementing the connection map in this manner makes it easy to compute the size of the payload for each destination.

A further aspect of the invention provides an apparatus for managing at least one list of data elements, the apparatus comprising:
a storage device for storing the data elements in a predetermined sequence of memory locations;
means for updating the list by moving a portion of the list through the sequence of memory locations. The apparatus can be implemented in hardware alone.

A further aspect of the invention provides a telecommunications switch comprising:
an input for receiving data from a plurality of sources;
a buffer for storing received data;

means for assembling the received data into payloads;

an output for transmitting the payloads to a plurality of destinations;

a memory for storing a map of connection instructions as at least one list of data elements in a predetermined sequence of locations within the memory;

means for managing the map, which is arranged to sequentially access the elements of the map to construct the payloads, and update the map by moving instructions through the sequence of memory locations so as to enable uninterrupted use of the map while it is updated. The invention also provides a connection map for use in such a telecommunications switch.

A still further aspect of the invention provides a method of updating a data structure, which structure comprises at least one ordered list of data elements stored in a predetermined sequence of locations of a memory device, the method comprising updating the structure by adding, deleting or changing the elements in such a manner as to maintain the order of the elements and to enable uninterrupted reading of the elements while updating is being carried out.

The method is particularly suited to updating connection maps and routing tables used in telecommunications systems and data networks. These applications are described in detail. However, it will be appreciated that the method has other applications, such as in event and process scheduling in real-time operating systems.

Preferred features may be combined as appropriate, and may be combined with any of the aspects of the invention, as would be apparent to a person skilled in the art.

BRIEF DESCRIPTION OF THE DRAWINGS

For a better understanding of the invention, and to show by way of example how it may be carried into effect, embodiments will now be described with reference to the accompanying drawings, in which.

DESCRIPTION OF PREFERRED EMBODIMENTS

Figure 1:
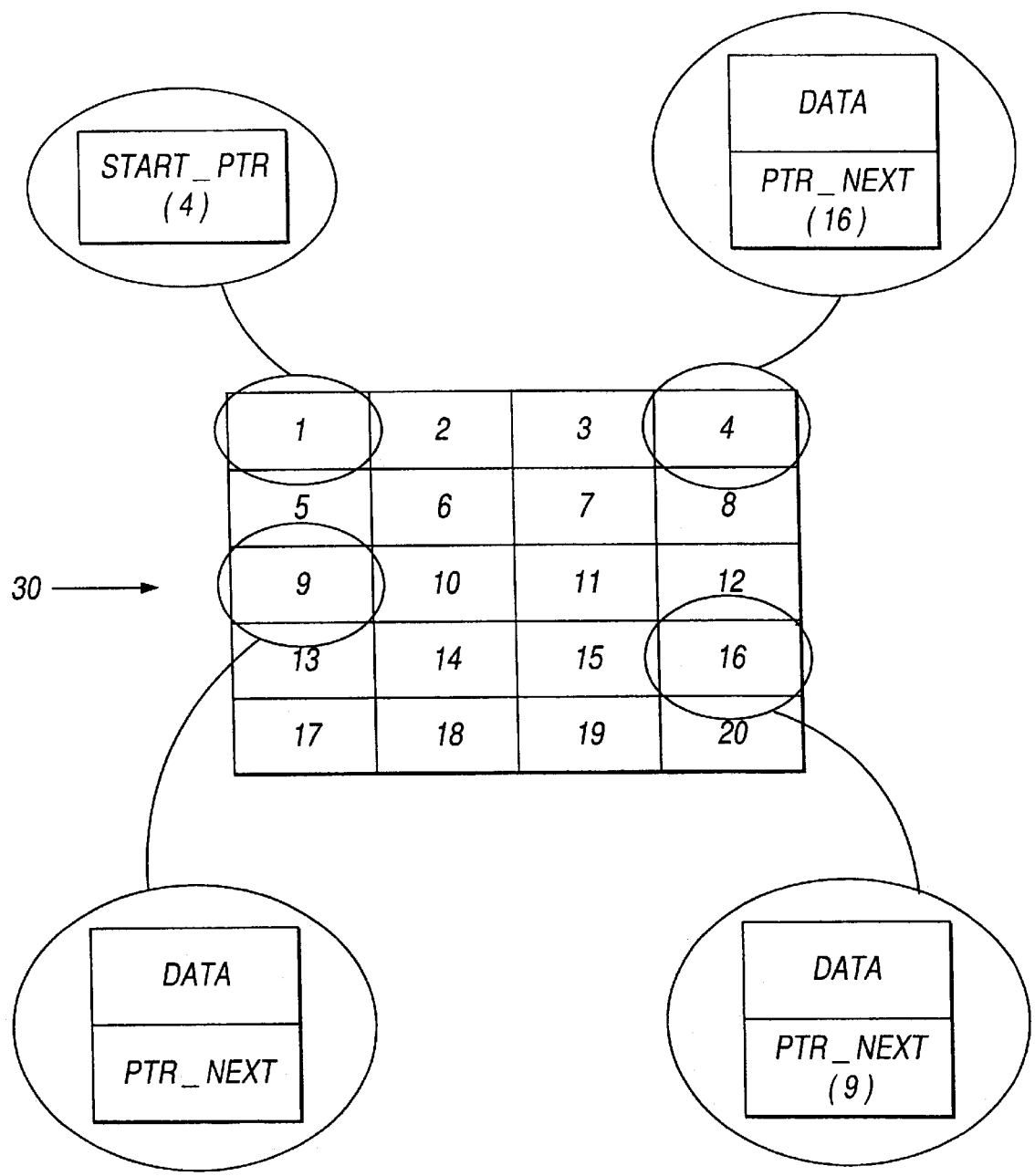
FIG. 1 shows a known method of implementing a linked list.
Figure 1A:
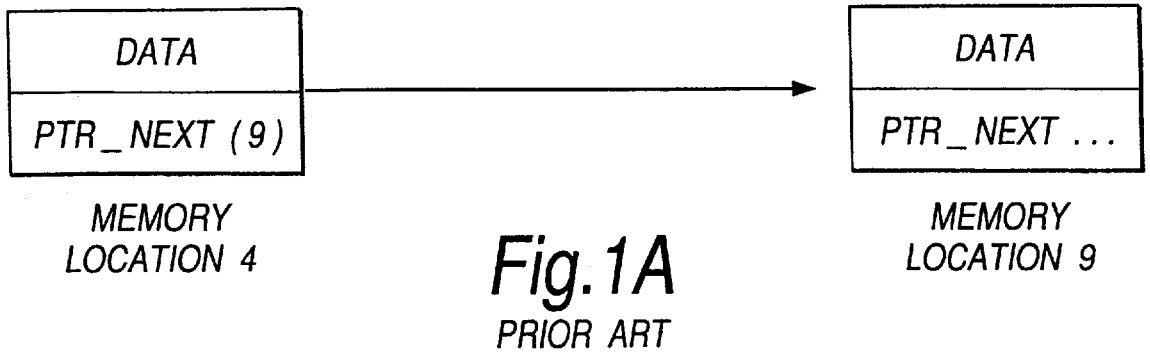
FIGS. 1A to 1C show how lists using the structure of FIG. 1 are updated.
Figure 1B:
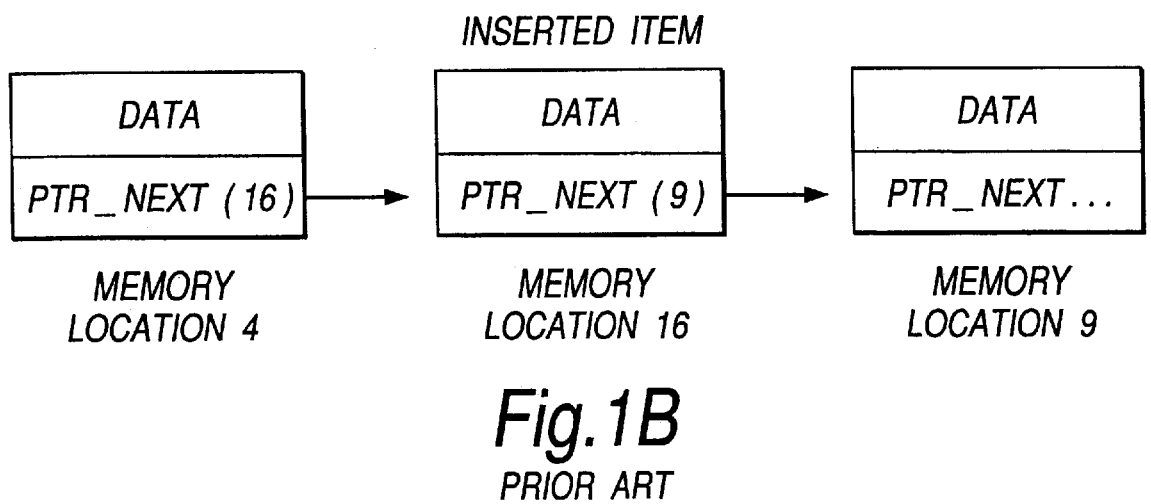
Figure 1C:
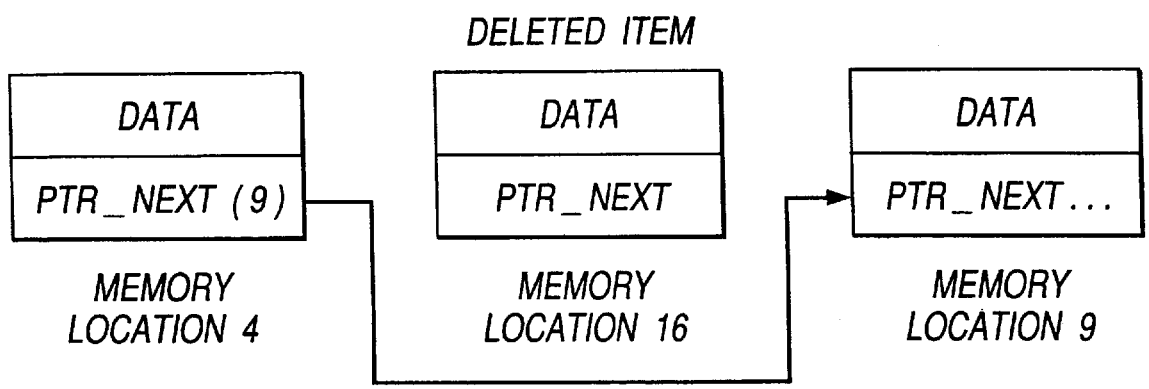
Figure 2:
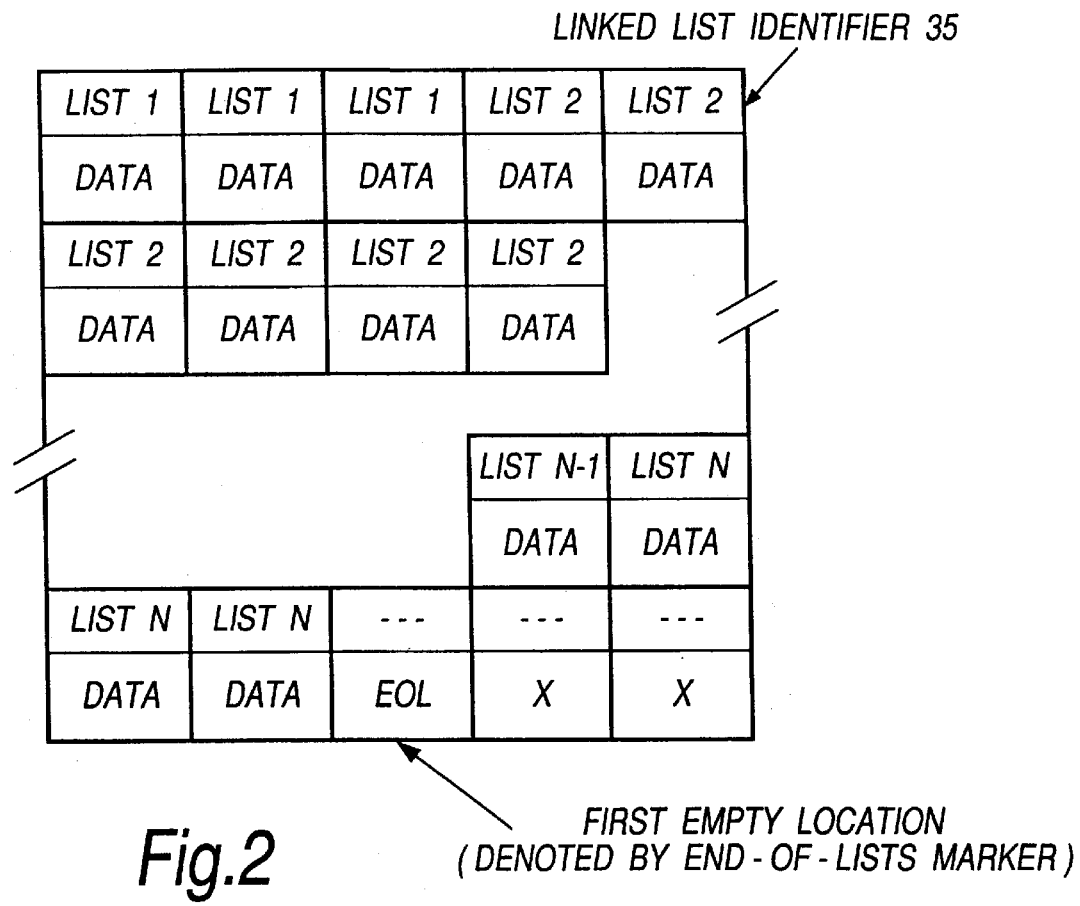
FIG. 2 schematically shows an arrangement of linked lists within a memory.

The basic configuration of a set of linked lists in memory is shown in FIG. 2. The memory can be used to maintain a single data list or can contain multiple linked lists. The total size of the memory defines the maximum limit for the combined length of all data lists. Each list is stored in a predetermined sequence of memory locations. In the arrangement of FIG. 2 the predetermined sequence of memory locations is a sequence of contiguous memory locations. This avoids fragmentation of the list and obviates the need for the control logic which is required to traverse a traditional linked list structure. Furthermore, all unassigned locations within the memory occur contiguously as a group at the bottom locations of the memory. One means to distinguish the boundary between the linked lists and unassigned memory is to maintain an End-Of-Lists marker EOL at the first free memory location.

In static operation the data items within the lists are accessed via a sequential read operation of the memory. Thus, in one complete cycle, the entire contents of the memory will be accessed and are available for use in subsequent processing. When multiple linked lists are maintained within the memory it is necessary to be able to delineate the boundary positions of the individual lists. This can be accomplished in several ways, for example by maintaining external counts of the current lengths of each list. Alternatively, an additional field within the memory store may be used to hold a list identifier 35. This increases the overall memory requirements of the process but eliminates the requirement for additional external control elements, and is the technique illustrated in FIG. 2. The additional field could represent an item of information which would otherwise need to be stored, and therefore need not add to the memory requirement. For example, in the telecommunications connection map application described later the list number represents the identity of the virtual channel into which each octet is asembled, an item of information which needs to be stored.

Figure 3:
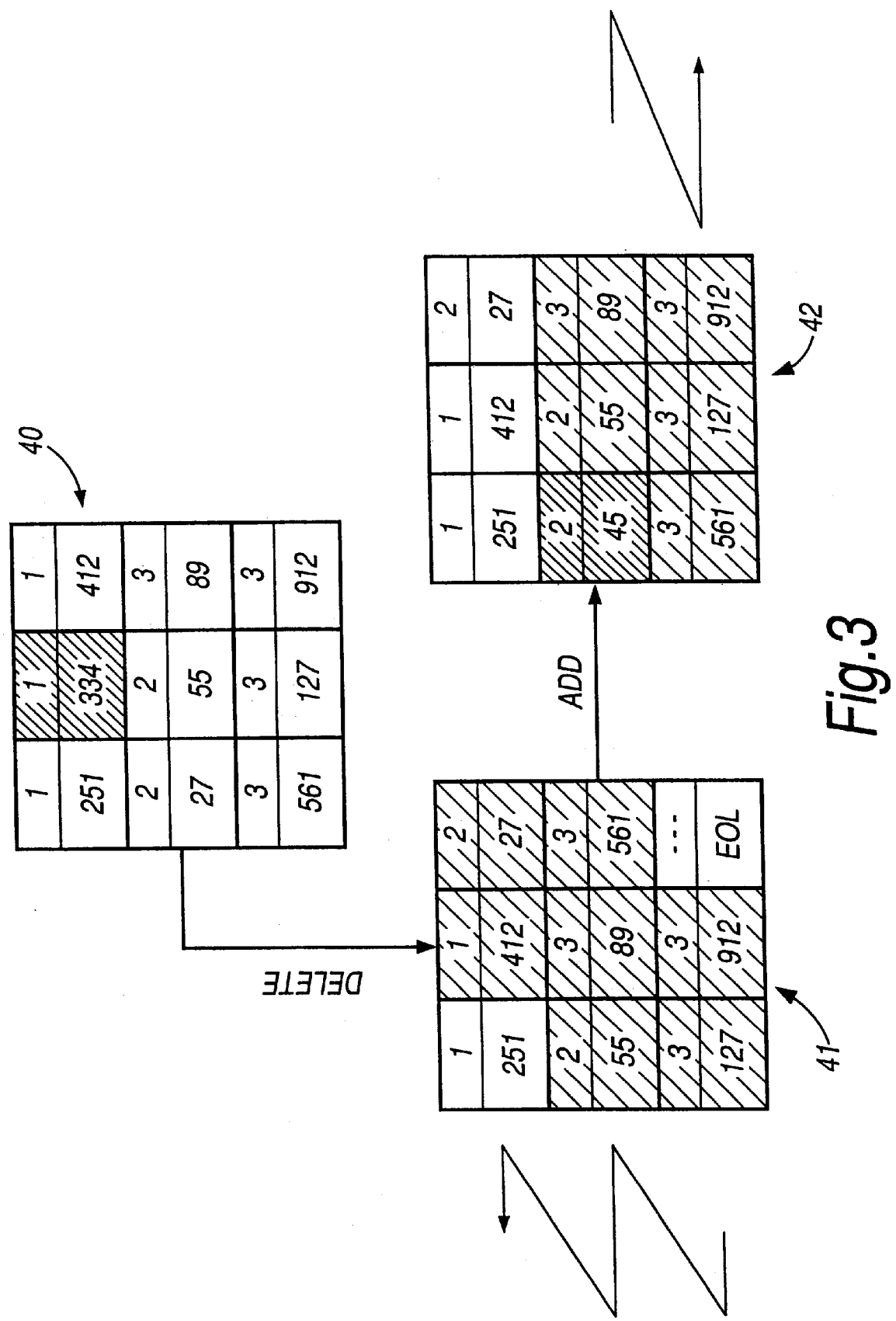
FIG. 3 shows the updating of a set of linked lists in memory.

FIG. 3 illustrates the processes for updating the lists. To update the lists, the memory is sequentially traversed in the normal manner until the item to be deleted or the position of the item to be inserted is located. An insert or delete operation will occur at this point. On subsequent memory accesses the original data is moved one location down in memory to compensate for an insert, or moved one location up in memory to compensate for a delete. Thus, in one complete memory cycle a full update of the linked list structure can be accomplished—the individual linked lists remain contiguous and null locations are still found at the bottom of the memory. The updated data lists are valid for use from the following memory cycle onwards. Block 40 shows the original state of the memory. Block 41 shows the state of the memory following a memory cycle during which a delete operation is performed to remove the item "334" from list 1. Block 42 shows the state of the memory following a further memory cycle during which an additional item "45" is added to linked list 2.

Figure 4:
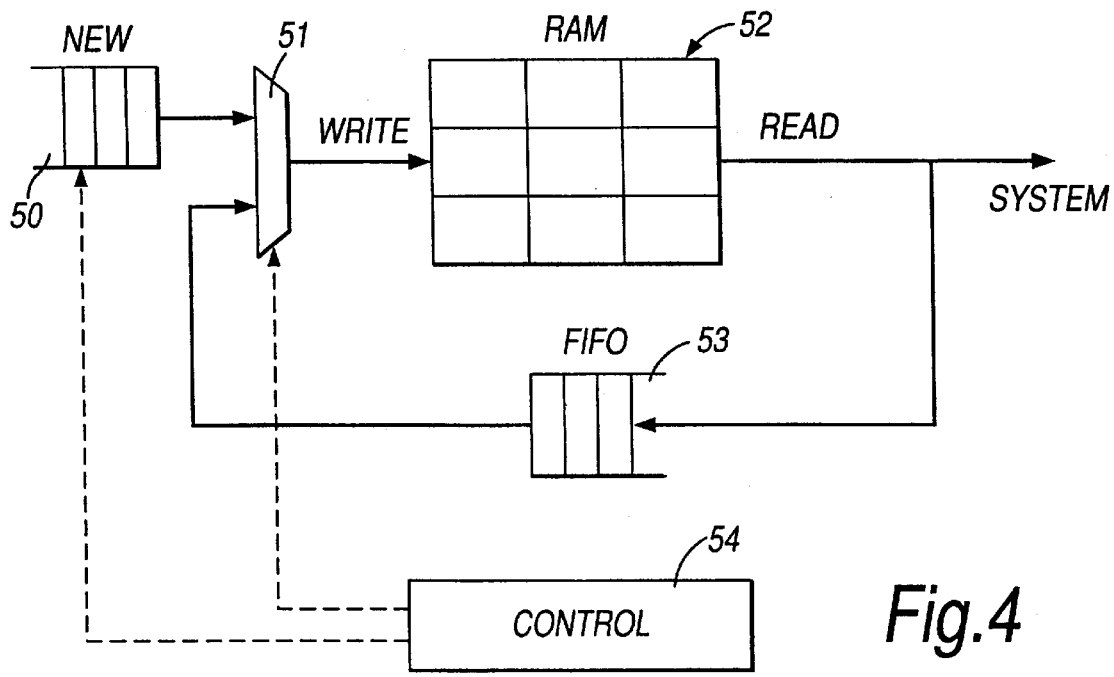
FIG. 4 shows a system for implementing the method shown in FIG. 3.

A system for implementing the update process is now described in further detail with reference to FIG. 4. The system comprises a general control entity 54, a memory 52 to store the linked lists (its size equal to the combined maximum lengths of all lists); a memory access mechanism that can perform a single read and single write operation during each access of the memory (the position of the read and write pointers may differ), a small FIFO 53 used for intermediate data storage during the shuffle down operation, and a comparator/logic function 51 to locate the position of each update operation within the memory. The size of FIFO 53 is arbitrary, but places an upper limit on the total number of inserts that can be achieved during each memory cycle. This is because the process of inserting items to the memory temporarily displaces some elements, as will be more fully described later. The memory can conveniently be a standard RAM device. These parts can be conveniently integrated in an ASIC.

To perform an update the control entity must provide the process with the identity of the list (and, for an insert, the new data item). In the simplest case—where new data is always added to the top of a list and old items are always deleted from the bottom of the list—this is sufficient information for the update process to be performed. However, this technique is not just limited to the pushing and popping of data onto and off of memory and can allow data items to be inserted/deleted at arbitrary positions within an individual list. In such cases the control entity must also provide the process with sufficient information to allow the position of the insertion/deletion point to be located. This information can take the form of either the relative position within a list (e.g. the 3rd item in list 4) or can be the value of a data item (to be deleted or the data item currently located at the insertion point).

The insert and delete processes will now be described in more detail. The term "memory cycle" represents one complete sequential scan of the memory contents during which each memory location is inspected and up dates are made. The term "access cycle" represents one inspection of one memory location during one such memory cycle.

To insert a new data item into a list, the memory is sequentially accessed in the normal manner until the insertion point is found. The contents of this memory location are transferred to the FIFO for temporary storage before the new data item is written to the memory at this point. On the following access cycle the data item in the next memory location is placed into the FIFO before it is overwritten (in the memory) by the data held within the FIFO. This process continues to the end of the memory cycle and at this point all of the data items located after the insertion point will have been shuffled down one position in the memory. The process can be extended to enable multiple inserts to be performed during a single memory cycle. To do this it is simply necessary to increase the size of the FIFO to equal the desired maximum number of inserts per cycle and to ensure that the data items are sorted into insertion order by the control entity. In this way, as each insertion point is located the data held in the FIFO grows by one element thus increasing the shuffle length by a further location.

The delete process operates in a similar manner. The memory is sequentially accessed until the item to be deleted is found. At this position the write pointer is set to lag the read pointer by a single location. On the next access cycle, the data read from the subsequent memory location is written into the previous location (overwriting the item to be deleted). This process is repeated until the end of the memory cycle and at this point all data immediately following the deletion position will be shuffled one location up in memory. It is also possible to extend the process to accommodate multiple deletes within a single memory cycle—for each deletion the write pointer is further decremented from the read pointer by one location thus increasing the shuffle length.

The insert and delete processes are mutually compatible and it is therefore possible to perform multiple inserts and deletes within one cycle—the only proviso being that the control entity orders the updates according to their insert/delete positions.

It is also possible to change an item in a list by consecutively performing an insert and a delete operation on the list.

Figure 5:
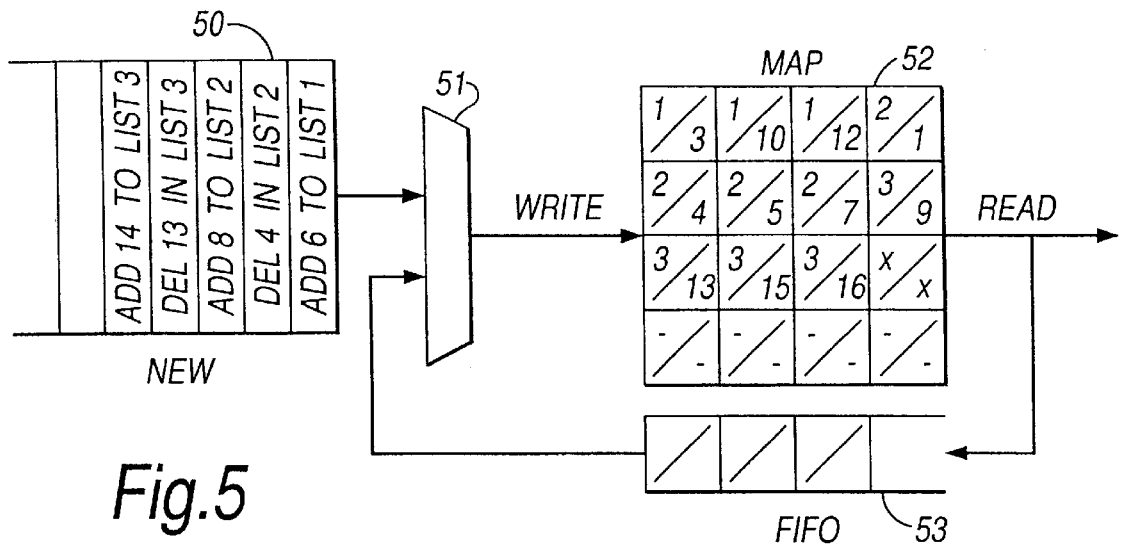
FIGS. 5 to 5B show the system of FIG. 4 in use to update linked lists.
Figure 5A:
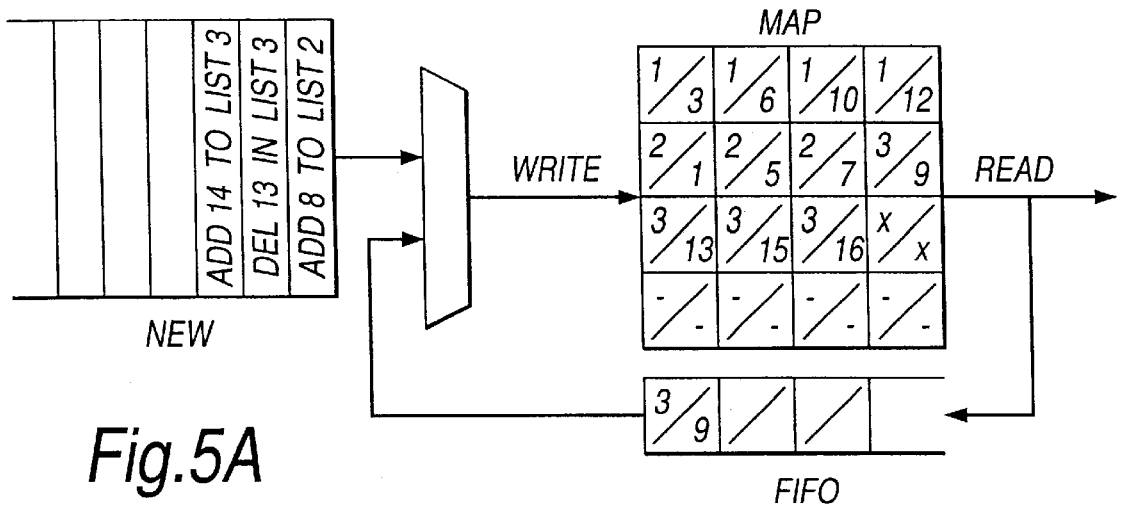
Figure 5B:
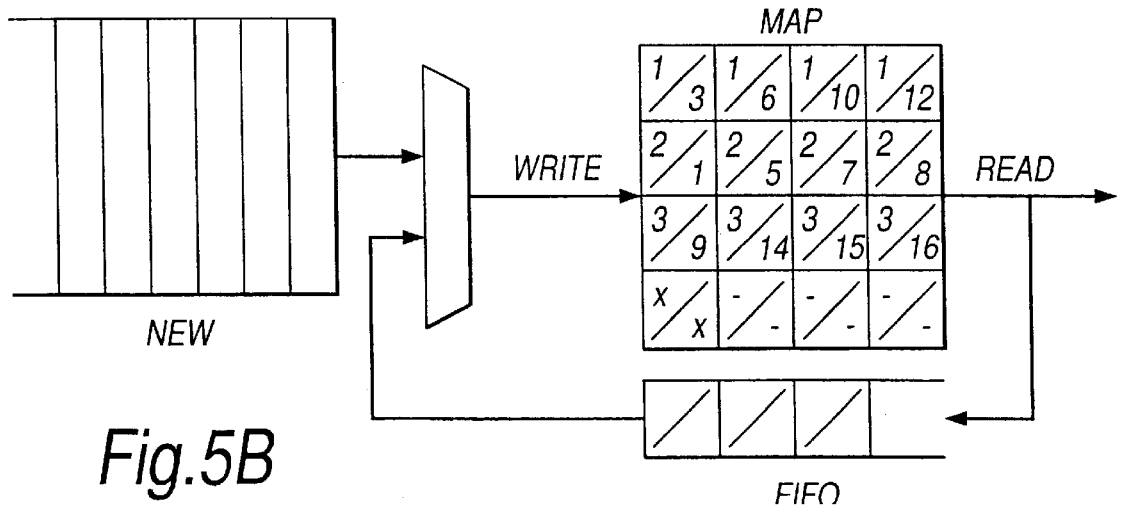

A detailed example of the update process is shown in FIGS. 5 to 5B. In this example three linked lists are maintained in a sixteen element memory. In a single update three insertions and two deletions are performed. It will be apparent that other combinations of insertions and deletions can be performed. FIG. 5 shows the situation at the start of the memory cycle, before any updates have occurred, with the set of update instructions for that cycle 50 arranged in the order in which the updates need to performed. FIG. 5A shows the situation part-way through the cycle, with three remaining updates still to be performed. FIG. 5B shows the situation at the end of the cycle. Table 1 describes each step of the example in detail, with the read and write operations and FIFO contents for each of the 16 accesses of the complete memory cycle. In describing the read and write operations the following notation is used:

'list number/data value . . . memory location' e.g. 1/3 from 1 means data having the value '3' in list 1 is read from memory location 1.

TABLE 1

Status of the update process during each access cycle

| Access Cycle | Read Operation | Write Operation | FIFO Contents | Notes |
|---|---|---|---|---|
| 1 | 1/3 from 1 | None | Empty | |
| 2 | 1/10 from 2 | 1/6 into 2 | 1/10 | First insert performed Shuffling of map begins. |
| 3 | 1/12 from 3 | 1/10 into 3 | 1/12 | |
| 4 | 2/1 from 4 | 1/12 into 4 | 2/1 | |
| 5 | 2/4 from 5 | 2/1 into 5 | 2/1 | First delete performed |
| 6 | 2/5 from 6 | x/x to 6 | 2/5 | First delete performed. Write pointer lags read pointer by one. |
| 7 | 2/7 from 7 | 2/5 into 6 | 2/7 | |
| 8 | 3/9 from 8 | 2/7 into 7 | 3/9 | |
| 9 | 3/13 from 9 | 2/8 into 8 | 3/9, 3/13 | 2nd insert performed - FIFO length = 2. |
| 10 | 3/15 from 10 | 3/9 into 9 | 3/13, 3/15 | |
| 11 | 3/16 from 11 | x/x into 10 | 3/15, 3/16 | 2nd delete - write pointer lags read by 2. |
| 12 | x/x from 12 | 3/14 into 10 | 3/15, 3/16, x/x | End of file reached by read pointer. 3rd insertion point found. |
| 13 | — | 3/15 into 11 | 3/16, x/x | |
| 14 | — | 3/16 into 12 | x/x | |
| 15 | — | x/x into 13 | Empty | Update completed. |
| 16 | — | — | Empty | |

When performing a net delete update to the structure i.e. an update containing more delete operations than insert operations on a previously full memory, it is necessary to re-insert an End-Of-List boundary marker.

One way of achieving this is to insert the marker using a spare write access in the following memory cycle. This is needed because the write pointer always lags the read pointer. The control entity ensures that this can be incorporated into any update due to be performed in the next cycle. Under the very rare situations where the immediately following update utilises all available write accesses (i.e. a full shuffle of the memory) the control entity will need to delay this new update by a single cycle.

Alternatively, a housekeeping period can be incorporated between successive memory cycles in which 'holdover' write cycles can be performed.

Update Algorithm

Figure 6:
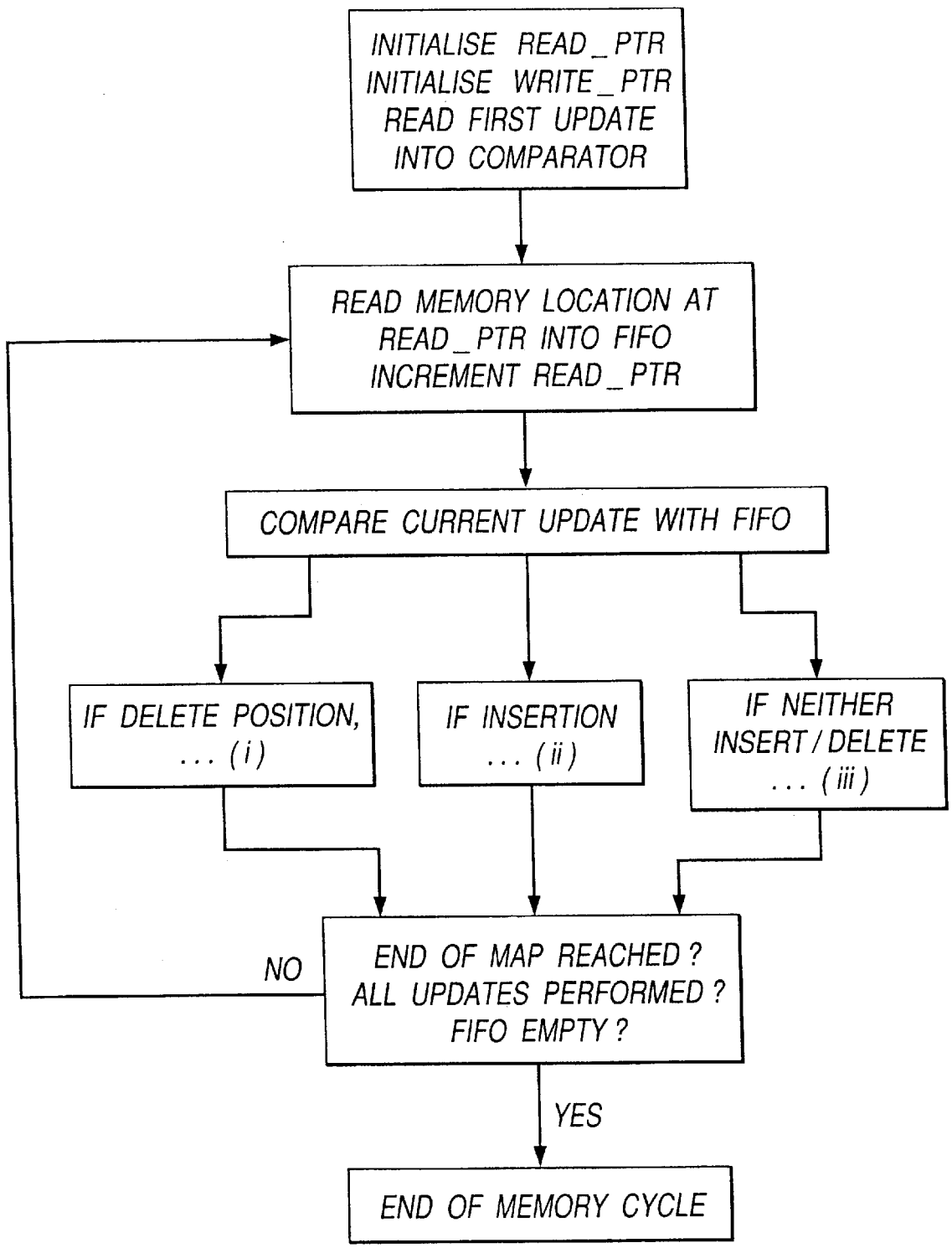
FIG. 6 shows a flow-chart of the method for updating the linked lists.

The update algorithm will now be described in detail with reference to the flow-chart shown in FIG. 6.

(a) Initialise Read_Ptr and Write_Ptr to the first location of memory 52. Read the contents of the first update into the comparator circuit 51.

(b) Read the memory location pointed to by the Read_Ptr into the FIFO. Post increment the Read_Ptr to the next location.

(c) Compare the current update field with the contents held in the top of the FIFO in comparator 51.

(i) If a deletion position is found then the memory location pointed to by the write pointer is overwritten by the null marker. The Write_Pointer is NOT post incremented. The data contents contained at the top of the FIFO are destroyed. The comparator circuit 51 is updated with the contents of the next update in list 50.

(ii) If an insertion position has been found the memory location pointed to by the Write_Ptr is overwritten by the insertion data. The Write_pointer is post incremented to point to the next memory location. The FIFO is not updated (the comparator uses the same data value in the following cycle in its comparison with the update contents) and its length therefore grows by one location. The comparator circuit 51 is updated with the contents of the next update in list 50.

(iii) If neither an insertion or deletion position is found then the contents at the top of the FIFO are written into the memory location pointed to by the Write_Ptr and the FIFO shuffled up by one location. The Write_Ptr is post incremented by one location. Alternatively, if the position of the first update has not yet been reached, then the memory contents pointed to by the Write_Ptr will remain unchanged after the write operation. Therefore the write access need not be performed and may be used for any other housekeeping task such as performing any holdover writes from the following frame cycle that could occur due to the net delete scenario previously described.

(d) Repeat steps (b) and (c) until either the end of the map is reached or all of the updates have been performed (all insertions and deletions have been performed, the end-of-file is reached by the read process, and the FIFO is empty).

An application to which the method is particularly suited is telecommunications routing tables. This application will now be described in more detail with reference to FIGS. 7 to 13A.

Figure 7:
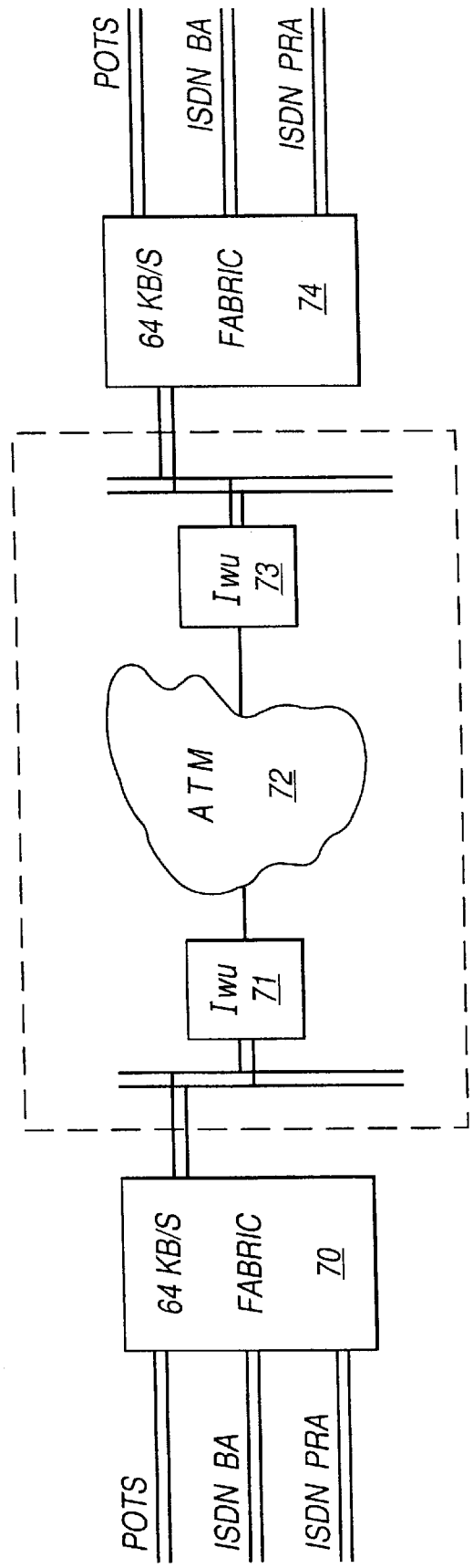
FIG. 7 shows a telecommunications system in which the method is used.

A mechanism is being developed to efficiently carry narrow-band voice or data traffic over a broadband ATM network. This concept is illustrated in FIG. 7. The synchronous narrowband traffic POTS, ISDN BA, ISDN PRA is carried over a 64 kb/s fabric 70. This terminates at a first inter-working unit (IWU) 71. IWU 71 adapts the narrow-band traffic into ATM cells which are then transported across the ATM network 72 to the far-end IWU 73. The far-end IWU de-adapts narrowband traffic back to the synchronous domain for transport over a further 64 kb/s fabric 74.

An ATM adaptation device called the Adaptive Virtual Junctor (AVJ) has been proposed to perform the task of assembling and disassembling narrowband voice channels into ATM payloads whilst preserving the synchronous framing information of the original data. This is described in more detail in patent application Ser. No. WO 95/35008 (Northern Telecom Limited.) The AVJ implements bulk adaptation i.e. all of the voice traffic to a particular trunk destination is consolidated into a single PVC cell stream for transport across the ATM network. In consolidating the traffic in such a way, the cell assembly delay normally associated with packing voice traffic into ATM cells is significantly reduced. In addition, by defining a minimum channel size (the minimum number of voice circuits consolidated into a single PVC) a minimum cell assembly delay can be guaranteed such that there is no need for echo cancellers on each voice circuit. This results in considerable savings in cost and complexity within the network. A second key feature of the AVJ is that bandwidth is allocated to a destination according to its instantaneous traffic load. Therefore, the size of a PVC will be allowed to rise or fall to match the number of voice channels currently connected to the relevant trunk destination. If the traffic falls below the minimum defined channel size padding will be used to maintain the guaranteed cell assembly duration.

The ingress function of the AVJ is responsible for the adaptation of narrowband voice channels into cells prior to transporting the cells across the ATM network 72. The egress function of the AVJ is responsible for the de-adaptation of the narrow-band voice channels from the ATM cells back to the synchronous domain. Within this system, there needs to be a means for the AVJ to maintain a dynamic connection table to enable the narrowband, frame-synchronised, voice traffic to be packed into and unpacked from the ATM cell payloads. The connection map must be continuously scanned, with each complete scan occurring in a 125 $\mu$s frame interval. This precludes the use of a traditional (software based) linked list structure. Further, to provide full cross-connectivity across the network it must be possible to connect any ingress timeslot to any egress timeslot. One way to achieve this is to provide a switching stage at both the ingress and egress functions. This is illustrated conceptually in FIG. 8. Each switching stage consists of a frame store 80, 82 with access to the frame store being controlled by connection maps 81, 83. The frame store performs a time switching function, i.e. the order of loading and unloading can differ. In this manner the ATM cells can be packed and unpacked in an arbitrary order achieving full cross-connectivity whilst enabling the connection tables to be ordered in an arbitrary manner. A problem with this approach is that each switching stage incurs a significant time delay (of 125 $\mu$s) and the net effect of double switching is to exceed the stringent narrowband delay budgets specified in today's telecommunication networks.

Figure 8:
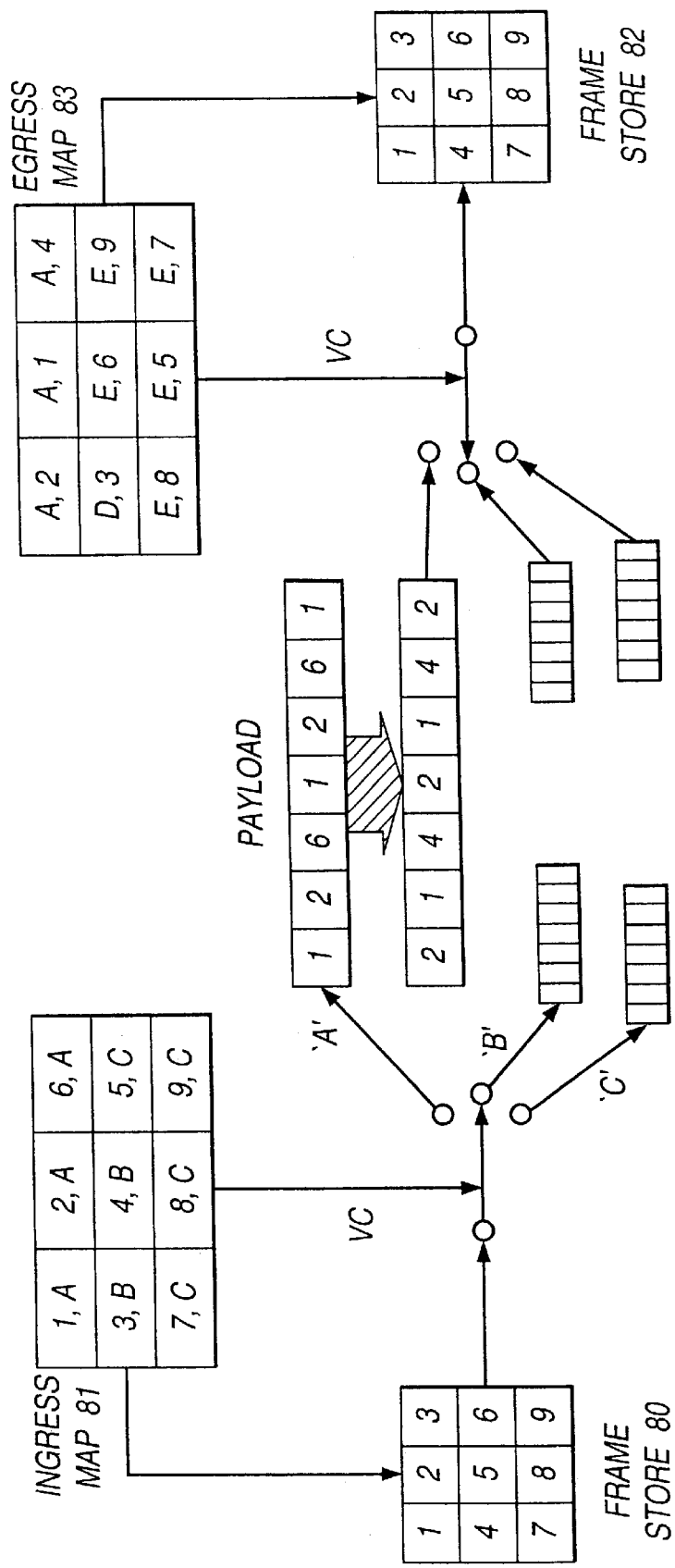
FIG. 8 shows one way of achieving cross-connectivity across the network of FIG. 7.

The ingress and egress operations for a Virtual Channel (VC) 'A' will now be described in more detail with reference to FIG. 8. At the ingress side, the payload for VC A is loaded in ascending order—the data in ingress timeslot 1 from frame store 80, followed by the data in ingress timeslot 2, followed by the data in ingress timeslot 6. However, at the egress side this data must be delivered to timeslots 2, 1 and 4 respectively. Thus data is not ordered in the payload with respect to the required positions on the egress timeslot structure.

To overcome this, a frame store is required at the egress side to provide a level of indirection between the disassembly of the payload and the egress synchronous timeslot structure . In this example, the data from ingress timeslot 1 is read from VC payload A and written into the egress frame store 82 at position 2, data from ingress timeslot 2 is written to egress frame store position 1 and finally data from ingress timeslot 6 is written to egress frame store position 4. Thus in the following 125 μs cycle the frame store constructed in this cycle can be written sequentially to the synchronous backplane structure.

Figure 9:
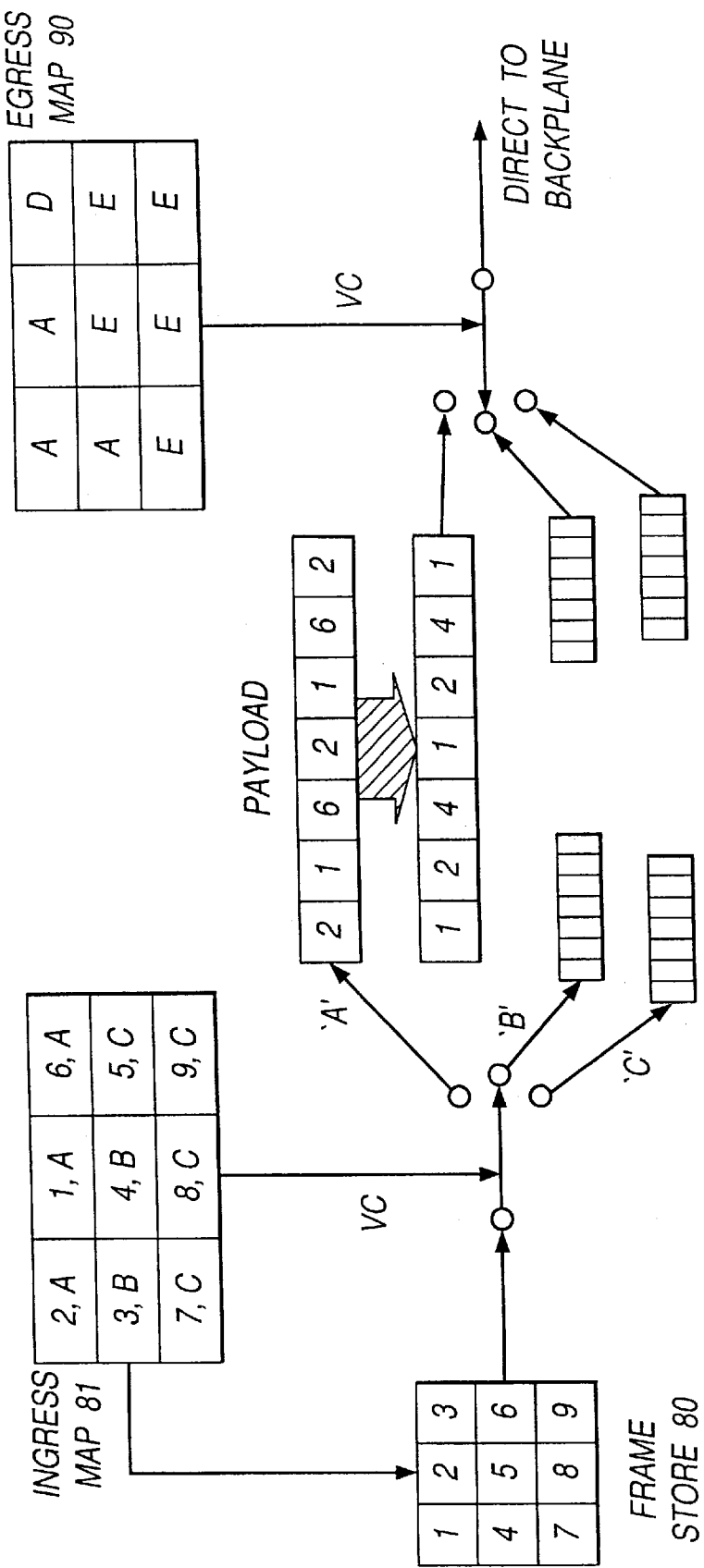
FIG. 9 shows an alternative way of achieving cross-connectivity across the network of FIG. 7.

The delay can be reduced, and the narrowband delay budget met, by eliminating one of the switching stages. The egress switching stage can be eliminated by assembling the ATM cells (at the ingress function) in the order that they need to be unpacked at the egress function. The narrowband channels can then be directly written to the synchronous backplane without the need for an egress frame store stage 82. This is illustrated in FIG. 9. The payload for Virtual Channel (VC) 'A' is assembled in the order of the data from ingress timeslots 2, 1, 6 At the egress side there is no requirement for a further frame store and the payloads can be disassembled directly to the synchronous backplane. The egress map thus merely states the VC from which to retrieve the relevant data octet which is to be written to the synchronous backplane. Thus in egress timeslot 1, the data octet from ingress timeslot 2 is read from the payload and written to the backplane; in egress timeslot 2 the data octet from ingress timeslot 1 is read from the payload and written to the backplane; and in egress timeslot 4 the data octet from ingress timeslot 6 is read from the payload and written to the backplane. The ordering of the ingress connection map is therefore dictated by the egress function. To set-up a new connection the egress function must therefore signal the order of the new call relative to its other connections. This can be achieved with a minimum of signalling message overhead as a full signalling handshake is usually performed between the ingress and egress functions to ensure a reliable call set-up procedure. However, a single new connection could now result in a requirement for a complete re-ordering of the ingress connection table. This would be impractical to achieve, without process interruption, using a conventional manner of updating the connection map. The properties of the dynamic data structure manager described here make it ideal for this process. The configuration and maintenance of the dynamic connection table in the ingress function is therefore one application of the invention.

Figure 10:
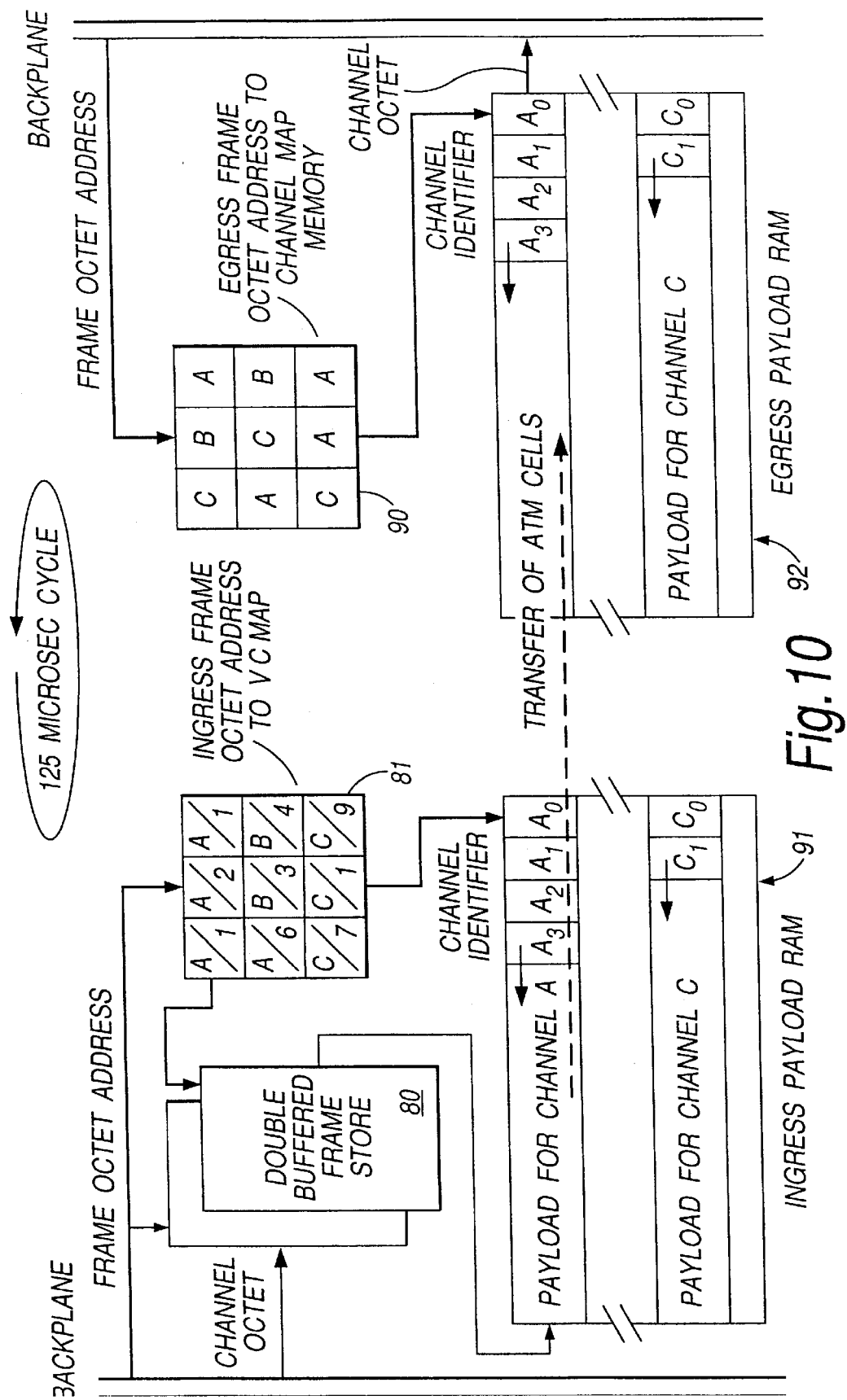
FIG. 10 shows a system to achieve cross-connectivity in the manner of FIG. 9.

A block diagram of the ingress and egress functions is shown in FIG. 10. The ingress function includes a frame store 80 into which the synchronous narrowband data from the backplane is stored. A payload RAM 91 is used to store ATM cells whilst they are being constructed. A further memory stores the connection map. Octets are read out of the frame store under the control of the connection map and into the payload RAM. Completed ATM cells are then transported across the ATM network to the egress function where they are stored in the egress payload RAM awaiting disassembly. The ATM cells are disassembled under the control of egress connection table 90. The narrowband channels are directly written to the synchronous TDM backplane.

The connection table is configured as a series of contiguous linked lists—one list per trunk destination (identified by PVC identifier). Each list contains the set of backplane addresses relating to the narrow-band channels currently connected to that destination. The order of the addresses within a list represents the order of unpacking on the egress side. In static operation, the connection table is addressed sequentially and for each non-empty memory location the address information is used to access a voice channel on the TDM backplane, stored in frame store 80, whilst the linked-list identifier identifies into which payload (channel A, B, C, . . . ) the octet should be placed.

As the linked lists are maintained contiguously in memory, it can be readily seen that it is a simple process for the AVJ to compute the current channel size of each traffic destination as the ATM payload is packed. The curent channel size is represented by the sum of the number of connections in a list. If the instantaneous channel size falls below a pre-defined minimum the payload padding process is automatically activated so as to maintain a predetermined transport delay for each of the narrowband circuits carried over the ATM network.

Figure 11:
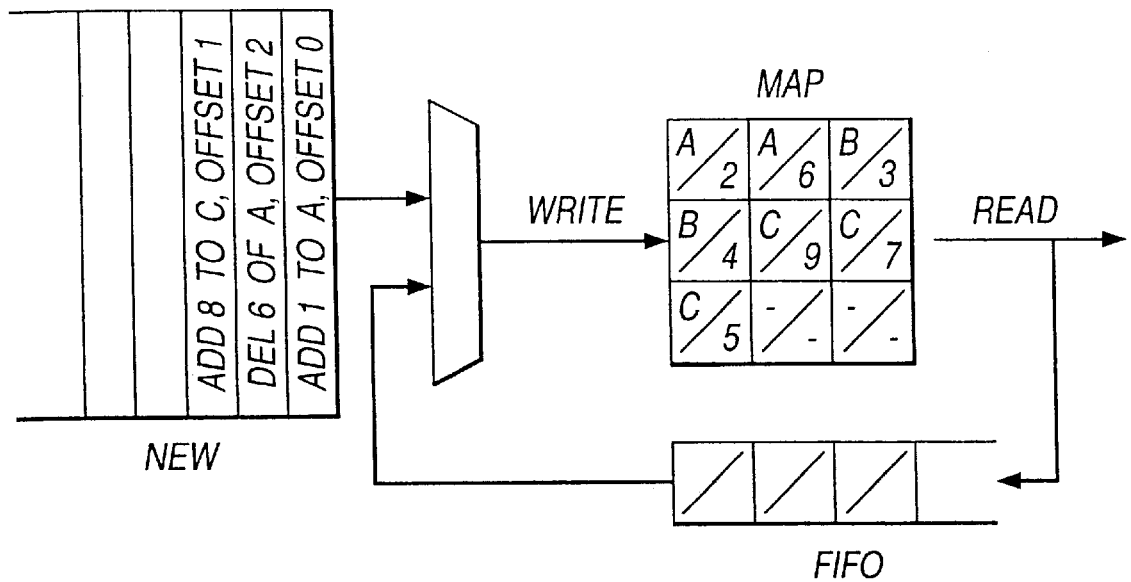
FIGS. 11 and 11A show the process of updating the connection table used in the system of FIG. 10.
Figure 11A:
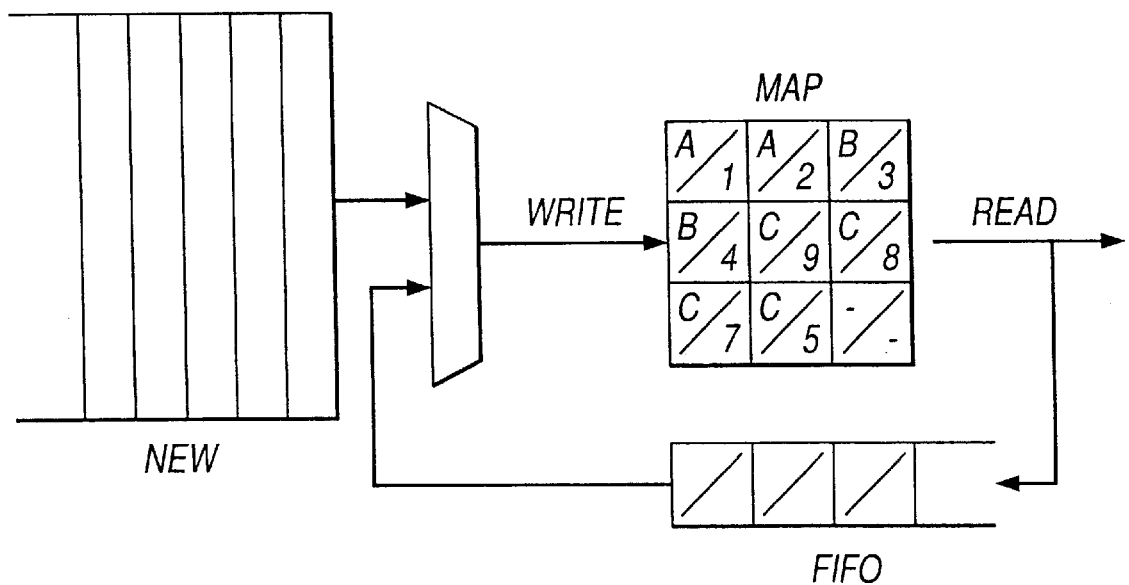

The connection table must be updated as new calls are set-up or existing calls are released. To add a new call, the egress function must signal the order of the new call within the VC. This order is computed as an offset e.g. an offset of 0 indicates that the new channel is to be the first channel in the VC. The ingress control entity sorts the updates (there may be multiple requests from the multiple egress AVJs to which it connects) into VC order. The update of the connection table is illustrated in FIGS. 11 and 11A. The update requests are presented to the connection map at the start of the frame. FIG. 11 shows a queue of three update requests comprising two new connections and one existing connection which is to be removed. The updates are arranged in the order in which they are to be performed; two updates to virtual channel A and one to virtual channel C. As the connection table is accessed sequentially the updated information is inserted or deleted with the original connection information being shuffled in memory accordingly. A full update is performed in a single 125 μs frame interval with the new connection information being valid from the following frame onwards. FIG. 11A shows the situation at the end of the memory cycle, with the updates completed. It can be seen that the update process is completely transparent to the normal operation of ATM cell assembly.

Figure 12:
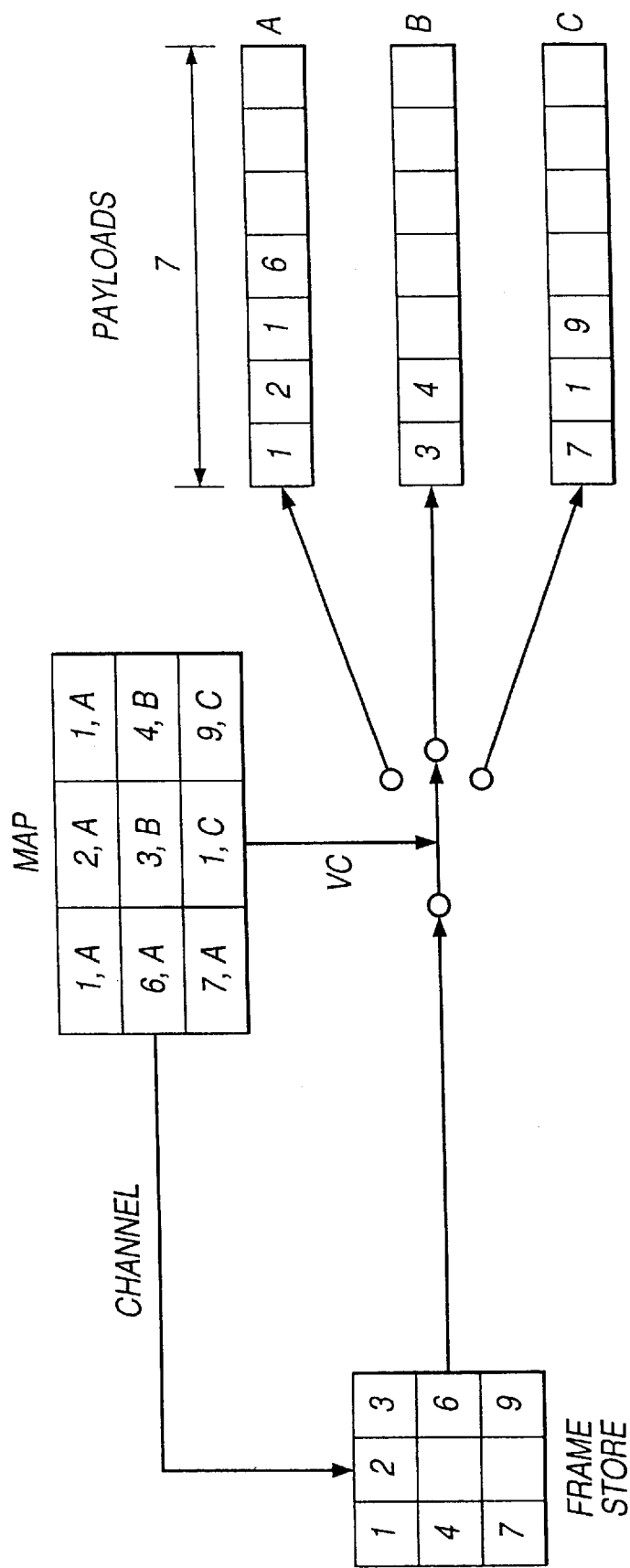
FIG. 12 illustrates the concept of multicasting.

A further feature of the update process is the ability to easily connect and maintain multicast calls. A multicast call comprises copying one ingress backplane voice channel to several egress backplane connections and is shown conceptually in FIG. 12. A particular channel may be replicated within a particular payload or to a number of different payloads. In FIG. 12 the contents of location '1' of the frame store (representing a particular narrowband channel) are copied twice into the payload for virtual channel A, and once into the payload for virtual channel C.

To set up a multicast call, the control entity must simply supply the process with the TDM backplane address and the multiple insertion points within the connection table (the call may be replicated both within a single PVC and across multiple PVCs). When the connection table has been updated, each copy of the call occupies one location within the connection map. The operation of providing multicast calls is completely transparent to the rest of the adaptation process. Providing multicast calls by this technique also has the important advantage of not requiring complex octet replication circuitry. This is because data is not copied, but is simply read from the frame store.

Figure 13:
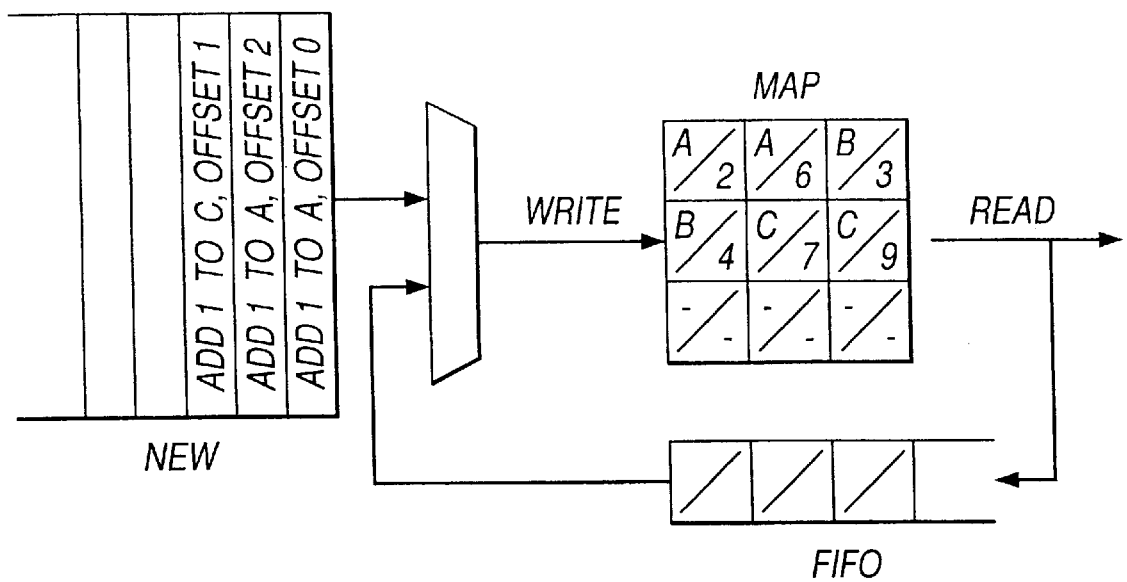
FIGS. 13 and 13A show the process of updating the connection table used in the system of FIG. 10 to achieve multicasting.
Figure 13A:
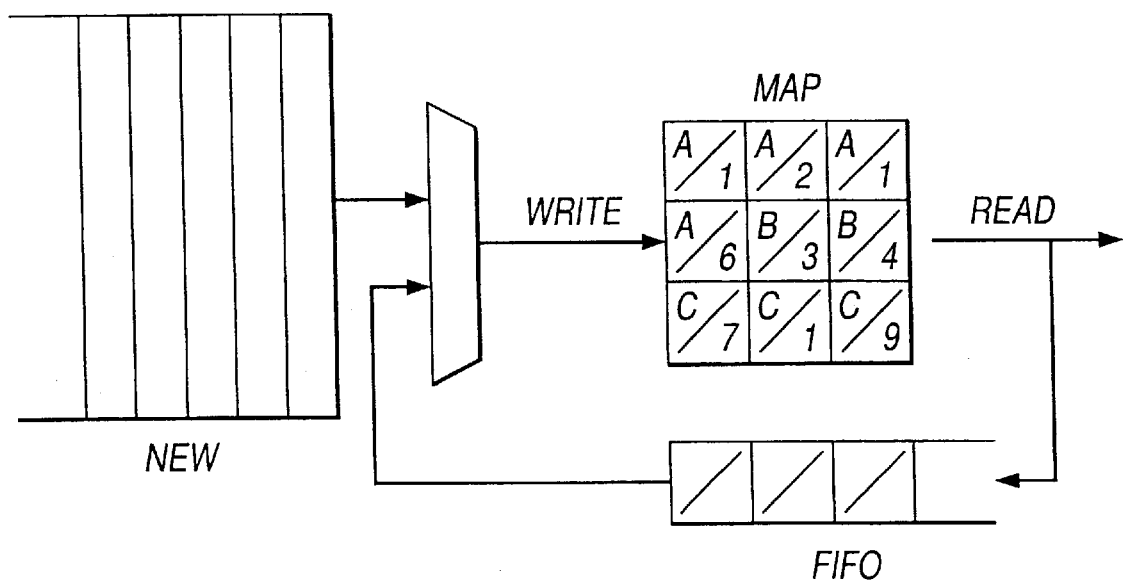

FIGS. 13 and 13A show the process of updating the connection table to support multicasting. FIG. 13 shows a queue of three update requests, to add the contents of location '1' of the frame store twice to channel A and once to channel C. FIG. 13A shows the resulting updated connection table.

What is claimed is:

1. A method for managing a connection map for a telecommunications switch, the map comprising one or more ordered lists of data elements comprising connection instructions for the switch, said elements being stored in a predetermined sequence of locations within a memory, the method comprising the steps of sequentially accessing each location of the memory in each of a sequence of memory access cycles comprising read operations and write operations, and updating the connection map by the insertion of new data elements in a said ordered list or by the deletion of existing data elements from a said ordered list, wherein said insertion of a new data element in a said ordered list is performed by determining, within a said access cycle, a memory location at which the new data element is to be inserted, storing in a temporary store comprising a first in first out (FIFO) memory a data element currently within that memory location, writing the new data element into that location, repeating the data element insertion process for every subsequent memory location by exchanging the data element in that memory location with the stored data element with the previous location so as to displace each data element subsequent to the inserted new data element by one memory location thereby preserving the order of the list, receiving a request for a multicast connection between a source and multiple destinations; creating a set of update instructions for the connection tables; and updating the connection tables with the set of update instructions during the use of the connection tables, wherein deletion of a data element from a said ordered list is performed by determining, within a said access cycle, a memory location at which the data element is to be deleted, and, sequentially for every memory location subsequent to that determined location, overwriting the data element stored in that subsequent location into the immediately previous location so as to displace each data element subsequent to the deleted data element by one memory location thereby preserving the order of the list, wherein a selected data element is changed by the performance of consecutive data element deletion and insertion operations, wherein said switch provides an interface to an asynchronous transfer mode (ATM) network, and wherein said one or more ordered lists of data elements constitute connection tables for enabling narrow band, frame synchronised, voice traffic to be packed into and unpacked from ATM cell payloads.

2. A telecommunications switch as claimed in claim 1 and comprising an asynchronous transfer mode (ATM) switch.

3. A telecommunications switch comprising: an input for receiving data from a plurality of sources; a buffer for storing received data; means for assembling the received data into payloads; an output for transmitting the payloads to a plurality of destinations; a memory for storing a map of connection instructions as at least one ordered list of data elements in a predetermined sequence of locations within the memory; and a temporary store comprising a first in first out (FIFO) memory; wherein said map of connection instructions comprises one or more ordered lists of data elements comprising connection instructions for the switch, said elements being stored in a predetermined sequence of locations within a memory; wherein the switch comprises request means for receiving a request for a multicast connection between a source and multiple destinations, means for creating a set of update instructions for the connection tables and for updating the connection tables with the set of update instructions during the use of the connection tables, and access means for sequentially accessing each location of the memory in each of a sequence of memory access cycles comprising read operations and write operations, and updating the connection map by the insertion of new data elements in a said ordered list or by the deletion of existing data elements from a said ordered list, wherein said insertion of a new data element in a said ordered list is performed by determining, within a said access cycle, a memory location at which the new data element is to be inserted, storing in said temporary store a data element currently within that memory location, writing the new data element into that location, repeating the data element insertion process for every subsequent memory location by exchanging the data element in that memory location with the stored data element with the previous location so as to displace each data element subsequent to the inserted new data element by one memory location thereby preserving the order of the list, wherein deletion of a data element from a said ordered list is performed by determining, within a said access cycle, a memory location at which the data element is to be deleted, and, sequentially for every memory location subsequent to that determined location, overwriting the data element stored in that subsequent location into the immediately previous location so as to displace each data element subsequent to the deleted data element by one memory location thereby preserving the order of the list, wherein a selected data element is changed by the performance of consecutive data element deletion and insertion operations, wherein said switch provides an interface to an asynchronous transfer mode (ATM) network, and wherein said one or more ordered lists of data elements constitute connection tables for enabling narrow band, frame synchronised, voice traffic to be packed into and unpacked from ATM cell payloads.

* * * * *